United States Patent [19]

Utsunomiya et al.

[11] Patent Number: 5,021,210
[45] Date of Patent: Jun. 4, 1991

[54] ANOMALY DIAGNOSIS SYSTEM FOR A NUCLEAR REACTOR CORE

[75] Inventors: Kazuhiro Utsunomiya; Nobumi Ooyama; Hideo Sakaba, all of Ibaraki, Japan

[73] Assignee: Power Reactor and Nuclear Fuel Development Corporation, Tokyo, Japan

[21] Appl. No.: 533,359

[22] Filed: Jun. 5, 1990

Related U.S. Application Data

[62] Division of Ser. No. 231,088, Aug. 11, 1988, Pat. No. 4,943,683.

[30] Foreign Application Priority Data

Aug. 17, 1987 [JP] Japan ................................. 62-203070

[51] Int. Cl.$^5$ ............................................. G21C 17/00
[52] U.S. Cl. .................................................. 376/247
[58] Field of Search ...................... 376/247, 245, 252; 340/584, 593, 870.17; 374/117, 119, 141, 142

[56] References Cited

U.S. PATENT DOCUMENTS

| 4,290,849 | 9/1981 | Uesugi et al. | 376/252 |
| 4,319,958 | 3/1982 | Fica et al. | 376/247 |
| 4,655,992 | 4/1987 | McKnight et al. | 376/247 |
| 4,876,059 | 10/1989 | Conroy | 376/247 |

FOREIGN PATENT DOCUMENTS 56-133603 10/1981 Japan ................................. 376/245

Primary Examiner—Daniel D. Wasil
Attorney, Agent, or Firm—Flynn, Thiel, Boutell & Tanis

[57] ABSTRACT

An anomaly diagnosis system for a nuclear reactor, comprising ultrasonic wave reflecting members and an ultrasonic wave emitter-receiver. The ultrasonic wave reflecting members are provided respectively on the fuel assemblies, and include a shape memory alloy which permits changing the shape thereof. The ultrasonic wave emitter-receiver is located exterior of the reactor vessel, and includes means for providing an anomaly detection signal to the plant protection system when the ultrasonic wave reflected by any one of the ultrasonic wave reflecting members is not received by the ultrasonic wave emitter-receiver.

4 Claims, 2 Drawing Sheets

FIG. 1
FIG. 2
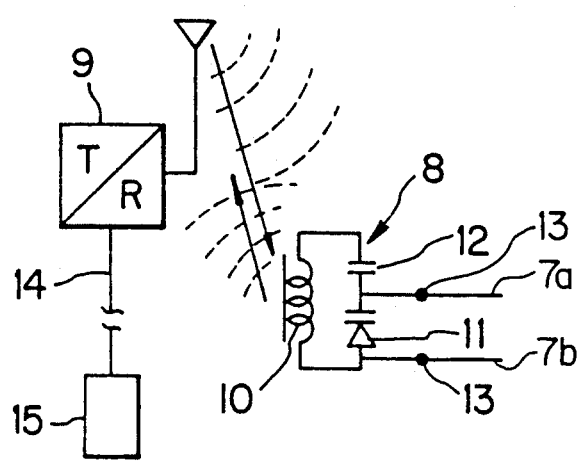
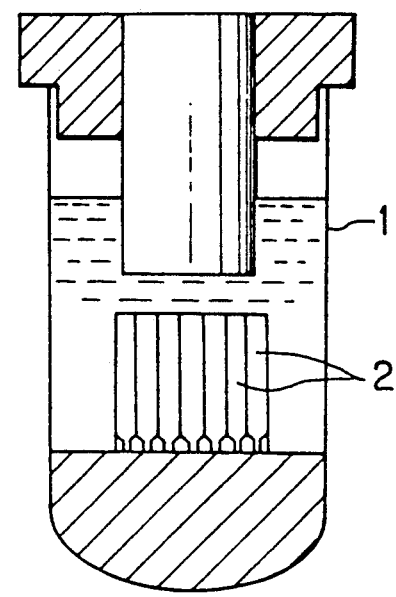
FIG. 3
FIG. 4
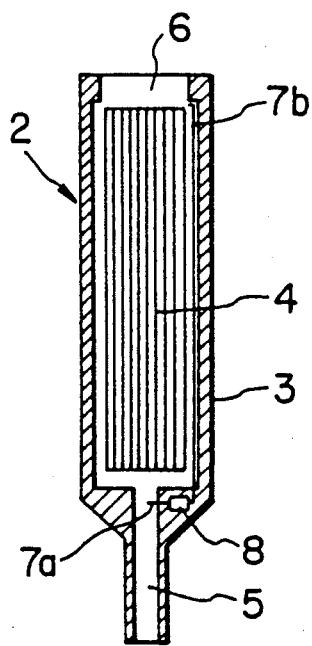
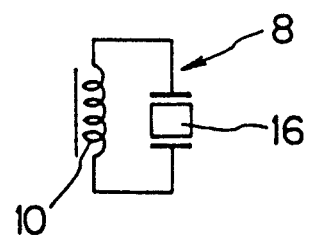

ANOMALY DIAGNOSIS SYSTEM FOR A NUCLEAR REACTOR CORE

This is a continuation division of Ser. No. 07/231,088, filed Aug. 11, 1988, now U.S. Pat. No. 4,943,683.

BACKGROUND OF THE INVENTION

1. Field of the Invention

The present invention relates to an anomaly diagnosis system for a nuclear reactor core, which gives an anomaly detection signal to a control rod driving mechanism or the like upon the detection of an anomaly in the nuclear reactor core, such as an excessive temperature rise in the reactor core, to shut down the nuclear reactor.

2. Description of the Prior Art

When an anomalous condition occurs in the fuel system of a nuclear reactor, a control rod is inserted in the core for safety control such as emergency shut down.

Conventionally, the anomalous reaction of the fuel in a nuclear reactor is diagnosed by detecting the flow rate and temperature of the coolant by a flow meter and a thermometer provided near the outlet of the coolant within the reactor vessel and connected through a cable to an external diagnosis unit, and the neutron flux density of the fuel assembly by a neutron detector inserted in the gap of the fuel assembly and connected through a cable to the external diagnosis unit.

Such a conventional diagnosis system, however, has the following problems.

First, the detection and warning of an anomalous condition by the detector provided at the exit of the reactor vessel or in the gap of the fuel assemblies delays the implementation of safety countermeasures.

Secondly, it is impossible to easily change the detector provided near the coolant outlet of the reactor vessel or in the gap of the fuel assemblies.

Thirdly, it is difficult to extend a cable connecting the detector to the outside reactor vessel and the deterioration of the cable reduces the reliability of anomaly diagnosis.

Fourthly, when the detector is inserted in the gap of the fuel assemblies, the detected neutron flux density and the detected temperature of the fuel assembly are dependent on the position and condition of the fuel assembly and are liable to deviate from true values, and thereby the reliability of anomaly diagnosis is reduced.

SUMMARY OF THE INVENTION

Accordingly, it is an object of the present invention to provide a highly reliable anomaly diagnosis system for a nuclear reactor core, eliminating the foregoing disadvantages of the conventional anomaly diagnosis system, capable of implementing safety countermeasures without an unacceptable delay, using detectors capable of being easily changed, eliminating difficulties in extending cables for anomaly detection, less liable to cause the cables to deteriorate, and capable of obtaining correct detected values regardless of the position and condition of the fuel assembly.

To achieve the object of the invention, the present invention provides an anomaly diagnosis system for a nuclear reactor core, comprising: an anomaly detecting unit provided in the fuel assembly, the anomaly detecting unit being capable of generating an echo signal which is varied upon the detection of an anomaly in the nuclear reactor core; and a transmitter-receiver which gives a signal to the anomaly detecting unit to make the anomaly detecting unit provide an echo signal and gives an anomaly detection signal to a plant protection system upon the reception of an echo signal representing an anomaly in the nuclear reactor core from the anomaly detecting unit.

The above and other objects, features and advantages of the present invention will become more apparent from the following description taken in conjunction with the accompanying drawings.

BRIEF DESCRIPTION OF THE DRAWINGS

FIG. 1 is a block diagram showing the general circuit constitution of an anomaly diagnosis system, in a first embodiment, according to the present invention;

FIG. 2 is a schematic sectional side elevation of a reactor vessel, in the first embodiment, according to the present invention;

FIG. 3 is a longitudinal sectional view of a fuel assembly, in the first embodiment, according to the present invention;

FIG. 4 is a circuit diagram of an anomaly diagnosis system, in a second embodiment, according to the present invention;

DETAILED DESCRIPTION OF THE PREFERRED EMBODIMENT

Figure 5:
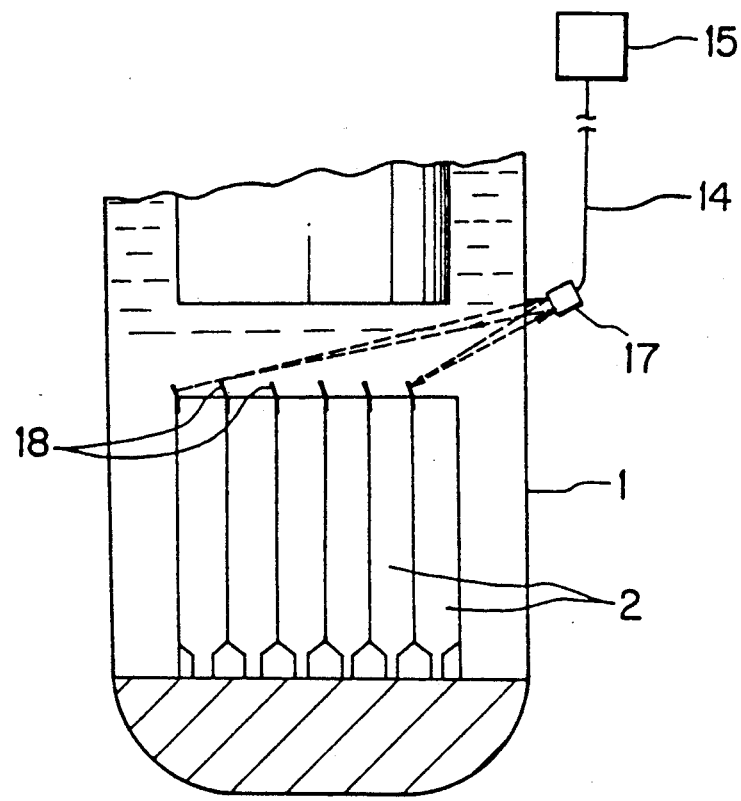
FIG. 5 is a schematic illustration of an anomaly diagnosis system, in a third embodiment, according to the present invention.

First Embodiment (FIGS. 1, 2 and 3)

Referring to FIGS. 1 through 3, a plurality of fuel assemblies 2 are disposed within a reactor vessel 1. As shown in FIG. 3, each fuel assembly 2 comprises a duct 3 and a plurality of fuel pins 4 contained in the duct 3. A coolant is introduced into the duct 3 through an inlet 5 formed at the bottom of the fuel assembly 2 and exchanges heat with the fuel pins 4 to cool the fuel pins 4 as the coolant flows toward an outlet 6 formed at the upper end of the fuel assembly 2. An anomaly detecting unit comprises thermocouples 7a and 7b for detecting the temperature of the coolant, and an echo capsule 8 connected to the thermocouples 7a and 7b. The thermocouples 7a and 7b are provided respectively near the inlet 5 and outlet 6 of the fuel assembly 2.

As shown in FIG. 1, the echo capsule 8 is associated with an external transmitter-receiver 9 for wireless communication therebetween by using radio waves. The external transmitter-receiver 9 transmits a radio wave to the echo capsule 8 and receives a radio wave echo of a frequency from the echo capsule 8. The normal frequency of radio wave echo provided by the echo capsule 8 varies when the echo capsule 8 detects an anomaly in the nuclear reactor core. The echo capsule 8 comprises an oscillating circuit consisting essentially of an exciting coil 10, a variable-capacity diode 11, a capacitor 12, and a terminal assembly 13 for connecting the echo capsule 8 to the thermocouples 7a and 7b. The variable-capacity diode 11 has a fixed electrostatic capacity C corresponding to the electromotive force V of the thermocouples 7a and 7b, and the echo capsule 8 has a resonance frequency Hf corresponding to the electrostatic capacity C of the variable-capacity diode 11.

When the normal frequency of the echo capsule 8 varies, the external transmitter-receiver 9 gives an anomaly detection signal through a cable 14 to a plant protection system 15, for example, for a control rod driving mechanism.

In operation, the external transmitter-receiver 9 transmits a pulse radio wave of the resonance frequency Hf to excite the echo capsule 8. When no anomaly is found in the nuclear reactor core, the echo capsule 8 transmits a radio wave echo representing a normal condition. The external transmitter-receiver 9 receives the radio wave echo and counts the frequency of the radio wave echo.

Suppose that an anomaly has occurred in the nuclear reactor core and the temperature difference between the coolant at the inlet 5 and the coolant at the outlet 6 has been caused to deviate from a reference temperature difference, the difference in thermoelectromotive force between the thermocouples 7a and 7b varies and the electrostatic capacity of the variable-capacity diode 11 varies. Consequently, the resonance frequency of the echo capsule 8 varies and hence the frequency of the radio wave echo varies. Upon the detection of frequency variation of the radio wave echo, the external transmitter-receiver 9 gives the anomaly detection signal through the cable 14 to the plant protection system 15 for the control rod driving mechanism to shut down the nuclear reactor.

In case the echo capsule 8 malfunctions, the frequency of the radio wave echo is stopped. Therefore, the malfunction of the echo capsule 8 can be detected through the detection of the stoppage of the frequency of the radio wave echo.

When the respective fuel assemblies 2 are provided with echo capsules 8 respectively having different resonance frequencies, an anomalous fuel assembly 2 along the plurality of fuel assemblies 2 can be identified.

Second Embodiment (FIG. 4)

In the second embodiment, the echo capsule 8 has an oscillating circuit incorporating an oscillator having a frequency of normal mode of vibration, such as a quartz oscillator 16, the frequency of normal mode of vibration varies according to temperature.

Figure 6:
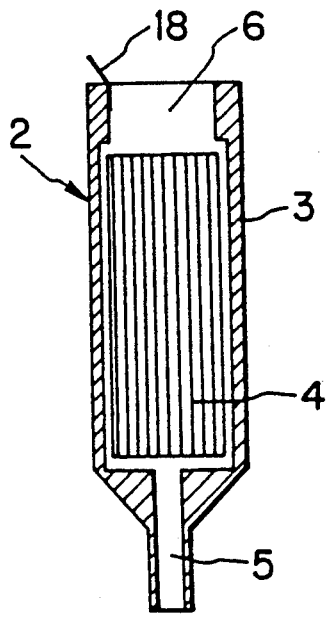
FIG. 6 is a longitudinal sectional view of a fuel assembly shown in FIG. 5, in the third embodiment, according to the present invention.
Figure 7:
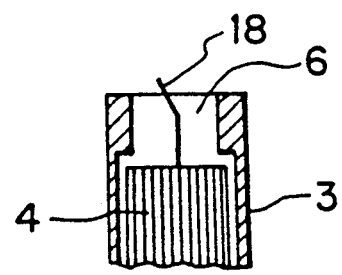
FIG. 7 is a partial longitudinal section of a modification of the fuel assembly of FIG. 6, in another example of the third embodiment, according to the present invention.

Third Embodiment (FIGS. 5, 6 and 7)

An anomaly diagnosis system, in a third embodiment, according to the present invention, has an external ultrasonic wave emitter-receiver 17 provided outside a reactor vessel 1. An ultrasonic wave reflecting member 18 as means for detecting an anomaly is provided on the top of each fuel assembly 2 so as to reflect an ultrasonic wave emitted from the ultrasonic wave emitter-receiver 17 toward a fixed point on the ultrasonic wave emitter-receiver 17. The ultrasonic wave reflecting member 18 is formed of a shape memory alloy. The ultrasonic wave reflecting member 18 deforms when heated to a predetermined shape memory restoration temperature, and thereby the reflecting direction of the ultrasonic wave reflecting member 18 is caused to change.

In a modification, the ultrasonic wave reflecting member 18 may be attached to one of the fuel pins 4 as shown in FIG. 7. The ultrasonic wave emitter-receiver 17 decides that an anomalous condition occurred in the fuel assemblies 2 when the same is unable to receive the echo ultrasonic wave.

In operation, all the ultrasonic wave reflecting members 18 reflect the ultrasonic wave emitted from the ultrasonic wave emitter-receiver 17 toward the ultrasonic wave emitter-receiver 17 as an echo ultrasonic wave. When the temperature of the coolant rises to the predetermined shape memory restoration temperature due to an anomaly in the nuclear reactor core, the ultrasonic wave reflecting members 18 deform to change the respective directions of reflection thereof. Consequently, the ultrasonic wave emitter-receiver 17 is unable to receive any echo ultrasonic wave. Thus, the ultrasonic wave emitter-receiver 17 detects the anomaly and gives an anomaly detection signal to a plant protection system 15.

When the ultrasonic wave reflecting member 18 is formed of a shape memory alloy containing a fissile material dispersed or sandwiched therein, the temperature of the ultrasonic wave reflecting member 18 is caused to rise to the shape memory restoration temperature by the anomalous increase of neutron flux density as well as the rise in the temperature of the coolant.

It is also possible to identify an anomalous condition in the fuel assembly 2 by searching the fuel assembly 2 from which the ultrasonic wave emitter-receiver 17 is unable to receive the echo ultrasonic wave.

As apparent from the foregoing description, the anomaly diagnosis system for a nuclear reactor core, according to the present invention has the following effects.

(1) The anomaly detecting unit incorporated into the fuel assembly detects an anomaly in the fuel assemblies directly, and a signal indicating an anomaly is transmitted by wireless from the echo capsule to the transmitter-receiver. Accordingly, the anomaly in the nuclear reactor core can immediately be detected and emergency countermeasures for shutting down the nuclear reactor can be implemented without delay.

(2) Incorporated into the fuel assembly, the anomaly detecting unit can be taken outside the reactor vessel and can easily be changed.

(3) Since the anomaly detecting unit communicates with the transmitter-receiver by wireless, the anomaly detecting unit and the transmitter-receiver need not be interconnected by a cable, and hence the anomaly diagnosis system eliminates difficulties in laying a cable and problems attributable to the deterioration of the cable and the reliability of anomaly diagnosis is improved.

(4) Since the diagnostic function of the anomaly diagnosis system is not affected by the position and condition of the fuel assembly, the anomaly diagnosis system has high reliability.

(5) Even if the anomaly detecting unit should fail to function properly, the malfunction of the anomaly detecting unit can be found through the detection of disappearance of the echo signal.

(6) Emergency counter measures can immediately be implemented without delay to shut down the nuclear reactor in case an anomaly occurs in the nuclear reactor core, and hence the higher burnup can be obtained without entailing any danger to improve the fuel cost economy of the nuclear reactor.

Although the invention has been described in its preferred form with a certain degree of particularity, obviously many changes and variations are possible therein. It is therefore to be understood that the invention may be practiced otherwise than specifically described herein without departing from the spirit and scope thereof.

What is claimed is:

1. In combination, a nuclear reactor having a reactor vessel with a plurality of fuel assemblies disposed therein, a plant protection system, and an anomaly diagnosis system, said anomaly diagnosis system comprising:

ultrasonic wave reflecting members provided respectively on the fuel assemblies, the ultrasonic wave reflecting members including a shape memory alloy which permits changing the shape thereof when said members are heated to the shape memory restoration temperature of said shape memory alloy; and an ultrasonic wave emitter-received means for emitting an ultrasonic wave toward the ultrasonic wave reflecting members and for receiving ultrasonic waves reflected respectively by the ultrasonic wave reflecting members, said emitter-receiver means being located exteriorly of said reactor vessel and including means for providing an anomaly detection signal to said plant protection system when the ultrasonic wave reflected by any one of the ultrasonic wave reflecting members is not received by said emitter-receiver means.

2. A combination according to claim 1, wherein one of said ultrasonic wave reflecting members is provided on each fuel assembly to permit identification of an anomalous condition in the fuel assemblies by searching any said fuel assembly from which the reflected ultrasonic wave is not received.

3. In combination, a nuclear reactor having a reactor core with a plurality of fuel assemblies, a plant protection system, and an anomaly diagnosis system, said anomaly diagnosis system comprising:

ultrasonic wave reflecting members provided respectively on the fuel assemblies, the ultrasonic wave reflecting members including a shape memory alloy which permits changing the shape thereof when said members are heated to the shape memory restoration temperature of said shape memory alloy; and an ultrasonic wave emitter-receiver means for emitting an ultrasonic wave toward the ultrasonic wave reflecting members and for receiving ultrasonic waves reflected respectively by the ultrasonic wave reflecting members, said emitter-receiver means including means for providing an anomaly detection signal to said plant protection system when the ultrasonic wave reflected by any one of the ultrasonic wave reflecting members is not received by said emitter-receiver means, said fuel assemblies including means for permitting coolant to pass therethrough, and the ultrasonic wave reflecting members being disposed so as to reflect the ultrasonic waves toward the ultrasonic wave emitter-receiver means while the temperature of the coolant flowing through the associated fuel assemblies if below the shape memory restoration temperature thereof.

4. A combination according to claim 3, wherein the ultrasonic wave reflecting members contain a fissile material.

* * * * *

UNITED STATES PATENT AND TRADEMARK OFFICE
CERTIFICATE OF CORRECTION

PATENT NO.  : 5 021 210
DATED       : June 4, 1991
INVENTOR(S) : Kazuhiro Utsunomiya et al It is certified that error appears in the above-identified patent and that said Letters Patent is hereby corrected as shown below:

Column 6, line 26; change "if below" to ---is below---.

Signed and Sealed this

Fifteenth Day of December, 1992

Attest:

DOUGLAS B. COMER

*Attesting Officer*    Acting Commissioner of Patents and Trademarks